Nov. 21, 1967  J. O. BEASLEY  3,354,372
DELAY-RESPONSIVE SHUT-OFF DEVICE FOR OPERATIONALLY-VIBRATING
ELECTRIC EQUIPMENT
Filed March 16, 1965
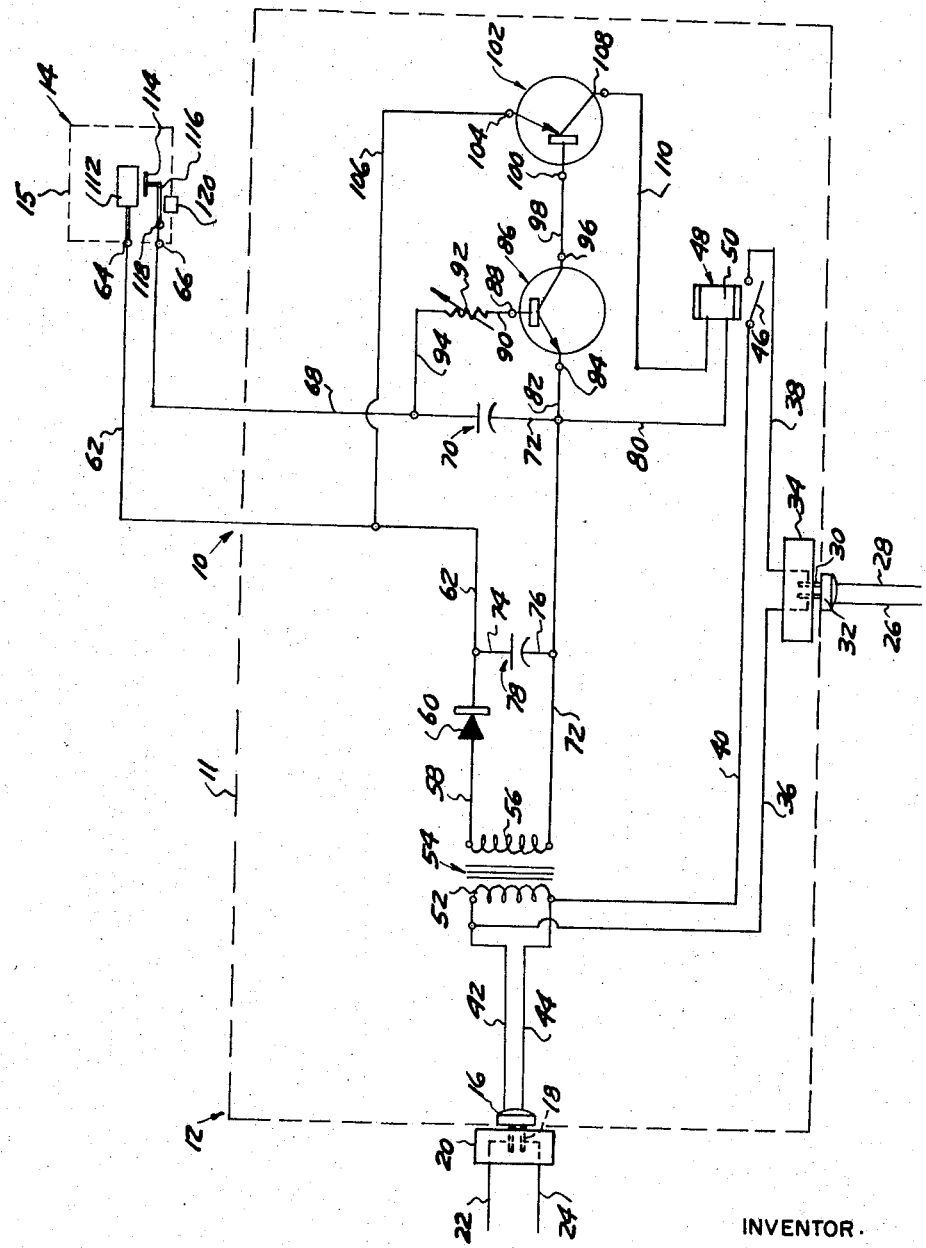
INVENTOR.
JACK O. BEASLEY.
Barthel & Bugbee
BY  ATTORNEYS United States Patent Office 3,354,372
Patented Nov. 21, 1967

3,354,372
DELAY-RESPONSIVE SHUT-OFF DEVICE FOR
OPERATIONALLY - VIBRATING ELECTRIC
EQUIPMENT
Jack O. Beasley, 7838 Terri Drive,
Garden City, Mich. 48135
Filed Mar. 16, 1965, Ser. No. 440,080
7 Claims. (Cl. 318—460)

ABSTRACT OF THE DISCLOSURE

This delay-responsive automatic safety shut-off arrangement for operationally-vibrating electric motor-driven equipment, such as electric typewriters, automatically shuts off the supply of electric current to the motor of such equipment after the lapse of a predetermined period of time during which the equipment has been idle and consequently has not emitted such operational vibration. This is accomplished by a control circuit interposed between the driving motor of the equipment and its current supply source and includes an operational vibration-responsive sensing device attached to the equipment so as to receive vibrations therefrom and a motor energization circuit connected thereto in such a manner that as long as the sensing device continues to receive such operational vibration resulting from the operation of the vibration-emitting equipment, the motor-energization circuit remains closed. On the other hand, after the predetermined period of time has elapsed following the cessation of operation and the consequent cessation of operational vibrations, the energization circuit is automatically opened so as to shut off the driving motor of the equipment. To resume operations, the driving motor must be restarted by the operator.

Hitherto, certain electric motor-driven equipment which emits distinctive operational vibration during use, such as electric typewriters, have been equipped with switches which are turned off manually when the operator has finished with the equipment. Frequently, however, because of the quietness of operation of its motor, the operator forgets to open the switch, with the result that the motor remains running for as much as a few hours to a few weeks at a time. This continuous running over long periods of time results in serious wear, occasional "freezing" of the bearings and often complete destruction of the motor. As a result, the typewriter requires frequent and costly maintenance and repair.

The accompanying drawing shows a wiring diagram of an automatic shut-off arrangement for electric power-driven operational vibration-emitting equipment according to one form of the invention, with the two units of the arrangement enclosed in separate dashed-line rectangles.

Referring to the drawing in detail, there is shown therein an automatic shut-off arrangement 10 for electric power-driven vibration-emitting equipment (not shown) according to one form of the invention, as including a casing 11 containing a vibration responsive energization maintenance circuit 12, which becomes de-energized in response to the cessation of operational vibration reaching an operational vibration-sensing device 14, electrically connected thereto and contained in a casing 15, after the lapse of a predetermined period of time following cessation of such operational vibration.

The operational vibration-responsive energization maintenance circuit 12 includes a current input plug 16, the blades 18 of which are inserted in an electric current outlet box 20 which is supplied with electric current from the wires 22, 24 of a suitable source of alternating current electricity, such as the ordinary house wiring circuit. The electric typewriter or other electric power-driven vibration-emitting equipment (not shown) is connected to the dual conductors 26 and 28 from the blades 30 of a plug 32 inserted in an outlet box 34, the terminals of which are connected by conductors 36 and 38, 40 to the conductors 42 and 44 emerging from the plug 16. Interposed between the conductors 38 and 40 is the normally open switch blade 46 of a relay 48 having a winding 50 which, when energized, closes its switch blade 46 and thereby closes the energization circuit between the condutcors 36 and 38, 40 leading to the motor-driven equipment connected to the plug 32.

In addition to being connected to the conductors 36 and 40, the conductors 42 and 44 are also connected to the primary winding 52 of a step-down transformer 54, the secondary winding 56 of which is connected by the line 58 to the rectifier 60. The latter may be a glass diode rated at 140 volts alternating current with a 12-volt 200 milli-ampere direct current output. From the rectifier 60, the line 62 runs to one terminal 64 of the vibration sensing device 14, from the other terminal 66 of which the line 68 runs to one terminal of a fixed condenser or capacitor 70. From the other terminal of the fixed capacitor 70, the line 72 runs to the remaining terminal or opposite end of the secondary winding 56 and serves as the ground reference line of the circuit 12. Also arranged in bridging lines 74 and 76 between the lines 62 and 72 is a fixed condenser or capacitor 78. The fixed capacitors 70 and 78 are conveniently rated at 15 volts direct current and 25 and 35 microfarads respectively. From the line 72 adjacent its connection to the fixed capacitor 70, a branch line 80 runs to one terminal of the winding 50 of the relay 48, and from the same location a line 82 runs to the emitter electrode 84 of an NPN transistor, generally designated 86, from the base electrode 88 of which a line 90 runs to one terminal of a variable resistor 92, from the opposite terminal of which a line 94 runs to the line 68 on the opposite side of the fixed capacitor 70 from the connection of the emitter electrode 84 by the line 82.

From the collector electrode 96 of the NPN transistor 86, a line 98 runs to the base electrode 100 of a PNP transistor 102, from the emitter electrode 104 of which the line 106 runs to a connection with the line 62. From the collector electrode 108 of the PNP transistor 102, a line 110 runs to the remaining terminal of the winding 50 of the relay 48.

The vibration sensing device 14 is in the form of a normally-open but vibrationally-closed inertia switch having a fixed contact 112 engaged by a movable contact 114 on the end of an oscillatory arm 116 which is pivoted at 118 and so mounted as to hold the movable contact 114 normally out of engagement with the fixed contact 112. The movable contact 114 is brought into engagement intermittently with the fixed contact 112 when subjected to machine-operational vibration or percussion, but is insensitive to the very slight vibration emitted by the driving motor itself. The vibration-responsive sensing device 14 is secured to the electric power-driven vibration-emitting equipment, such as an electric typewriter, by attaching it in any suitable way, such as by taping it to the frame of the electric typewriter or other vibration-emitting equipment. The movable contact 114 on the pivoted arm 116 may also be brought manually into engagement with the fixed contact 112 by the operator's manually depressing a pushbutton 120.

The NPN transistor 86 and the PNP transistor 102 may be of the types manufactured and sold by the General Electric Company of Schenectady, New York under the designations 2N2712 and 2N111 respectively. The relay 48 may be of the type manufactured and sold by Sigma Instruments, Inc., 78 Pearl Street, South Braintree, 85, Massachusetts, under the designation 550/G/SEL and is a direct-current, single-pole double-throw relay with a 7½ milliampere rating.

In the operation of the invention, let it be assumed that the plug 16 is inserted in the current supply outlet 20, that the plug 32 connected to the electric typewriter or other vibration-emitting equipment is inserted in the outlet 34 of the vibration-responsive energization maintenance circuit 12, and that the vibration sensing device 14 is taped or otherwise attached to the typewriter. Assuming the vibration-responsive equipment to be an electric typewriter, the vibration or percussion produced in the typewriter frame by the typing action of the typist or of the carriage being shifted by the typist causes the movable contact 114 on the pivoted arm 116 to swing momentarily into engagement with the fixed contact 112.

With a temporary connection thus made from the 12-volt direct current power source 60 to the fixed capacitor 70, the capacitor 70 is charged to 12 volts. With this 12 volts direct current potential in the line 94, emitter-base current through the transistor 86 will start to flow through the resistor 92 from the ground reference line 72 to the 12 volts direct current potential in line 94. As soon as the contacts 112 and 114 are disconnected by the cessation of vibration thereat, this current will continue to flow until the fixed capacitor 70 is completely discharged. The amount of time this current will flow will depend on the values of the capacitor 70 and resistor 92. Until the capacitor 70 is discharged, a voltage or potential difference continues to exist between the emitter electrode 84 and the base electrode 88 of the transistor 86 which is such as to give us a forward bias on this transistor 86.

With the transistor 86 thus conducting, this in effect gives a low resistance between the ground reference line 72 and the base electrode 100 of the transistor 102, whereupon a voltage difference will exist between the base electrode 100 and the emitter electrode 104 of the transistor 102. This voltage difference is such as to give a forward bias on the transistor 102 and thus cause this transistor 102 to conduct. Since the transistor 102 is connected in series with the winding 50 of the relay 48, conduction of the transistor 102 will energize the winding 50 of this relay 48, thereby closing its normally-open switch blade 46 and consequently connecting the lines 38 and 40 to the line 36, thus supplying 110 volt alternating current to the outlet 34 and thence to the plug 32. Thus, when the previous series of events has taken place, the electric typewriter motor will be energized.

If, however, a predetermined period of time has elapsed since the contacts 112 and 114 had made connection and had thereby charged the capacitor 70, this capacitor 70 will have had time to discharge through the resistor 92. When the capacitor 70 has been completely discharged in this manner, then no difference in potential will continue to exist between the base electrode 98 and the emitted electrode 84 of the transistor 86. Without the forward bias on the transistor 86 resulting from this potential difference, the transistor 86 then has the effect of a high resistance between the emitter electrode 84 and the collector electrode 96, thus putting the base electrode 100 of the transistor 102 at nearly the same potential as the emitted electrode 104. This then eliminates the forward bias on the transistor 102, thus causing it to cease to conduct. With the transistor 102 not conducting, the winding 50 of the relay 48 is de-energized and its switch blade 46 opens, thus shutting off the typewriter by opening its energization circuit between the lines 38 and 40.

In summary, as long as the vibration or movement of the electric typewriter or other vibration-emitting equipment causes the contacts 112 and 114 of the vibration sensing device 14 to continue to make contact, the typewriter motor will be kept running. If, however, after the lapse of a predetermined period of time, the contacts 112 and 114 have not made contact, then the fixed capacitor 70 will have had time to discharge and thus will cause the switch blade 46 of the relay 48 to break contact and halt the typewriter motor.

To manually restart the typewriter motor, the operator also depresses the push button 120 or taps the sensing device 14, thus manually causing the contacts 112 and 114 to re-engage. Either of these procedures starts the timing device 10, thus starting the motor of the typewriter or other vibration-emitting equipment. The time interval elapsing between the instant the last contact was made between the contacts 112 and 114 and the time the motor of the typewriter or other vibration-emitting equipment will shut off is controlled by the value of the resistance of the resistor 92. This value can be pre-set in the selection of the resistor 92 or the latter may have the manual adjustment of a variable resistor, as shown in the drawing.

The casing 11 houses all but the sensing device 14 and may be made small enough to be plugged into any 110-volt alternating current outlet 20. The plug 32 of the typewriter power cord containing the conductors 26 and 28 is then plugged into the outlet 34. The lines 62 and 68 then go to the sensing device 14 which, as previously stated, is connected to the typewriter. As the casing 15 of the sensing device 14 is quite small, it can be connected to the typewriter either by a magnet, by a sticky substance, by adhesive tape, or by any other suitable means.

What I claim is:

1. A delay responsive automatic shut-off arrangement for electric-motor-driven operational-vibration-emitting equipment, comprising an equipment motor energization circuit,
a relay having an operating coil and a normally-open relay switch connected in controlling relationship with said motor energization circuit,
a relay operating coil circuit effective upon energization to hold closed said normally-open relay switch,
a normally-open operational-vibration-responsive control switch adapted to close in response to its reception of operational vibration from the equipment and adapted to open in response to cessation of such operational vibration,
and electric means responsive to the closing of said control switch for energizing said relay operating coil circuit and responsive to a predetermined delay following such closing of said control switch for de-energizing said relay operating coil circuit.

2. A delay-responsive automatic shut-off arrangement, according to claim 1, wherein said energizing means includes a capacitor circuit connected in electric current supplying relationship to said relay operating coil circuit, said capacitor circuit including a capacitor, a current-flow-impeding device interposed between said capacitor circuit and said relay operating coil circuit, and a capacitor charging device connected to receive electric current from said equipment motor energization circuit to charge said capacitor.

3. A delay-responsive automatic shut-off arrangement, according to claim 2, wherein said current-flow-impeding device includes transistor means responsive to the establishment of an electric potential from said capacitor for effecting current conduction therethrough to said relay operating coil circuit and responsive to the cessation of such electric potential for substantially terminating such current conduction to said relay operating coil circuit.

4. A delay-responsive automatic shut-off arrangement, according to claim 3, wherein said current-flow-impeding device also includes a current flow-delay resistor connected between said capacitor circuit and said transistor means.

5. A delay responsive automatic shut-off arrangement, according to claim 4, wherein said current flow delay resistor comprises a variable resistor.

6. A delay-responsive automatic shut-off arrangement, according to claim 2, wherein said electric current in said motor energization circuit is an alternating current circuit and wherein said capacitor charging device includes alternating current rectifying means supplying direct current to said capacitor circuit to charge said capacitor.

7. A delay responsive automatic shut-off arrangement, according to claim 6, wherein a step-down transformer is interposed between said motor energization circuit and said capacitor circuit.

References Cited

UNITED STATES PATENTS 2,802,163   8/1957   Lambert et al. _____ 318—460

ORIS L. RADER, *Primary Examiner.*

B. A. COOPER, *Assistant Examiner.*